(No Model.)
G. H. DREW.
COMBINED DEMAND DRAFT AND ADVERTISING COUPON.
No. 493,619. Patented Mar. 14, 1893.
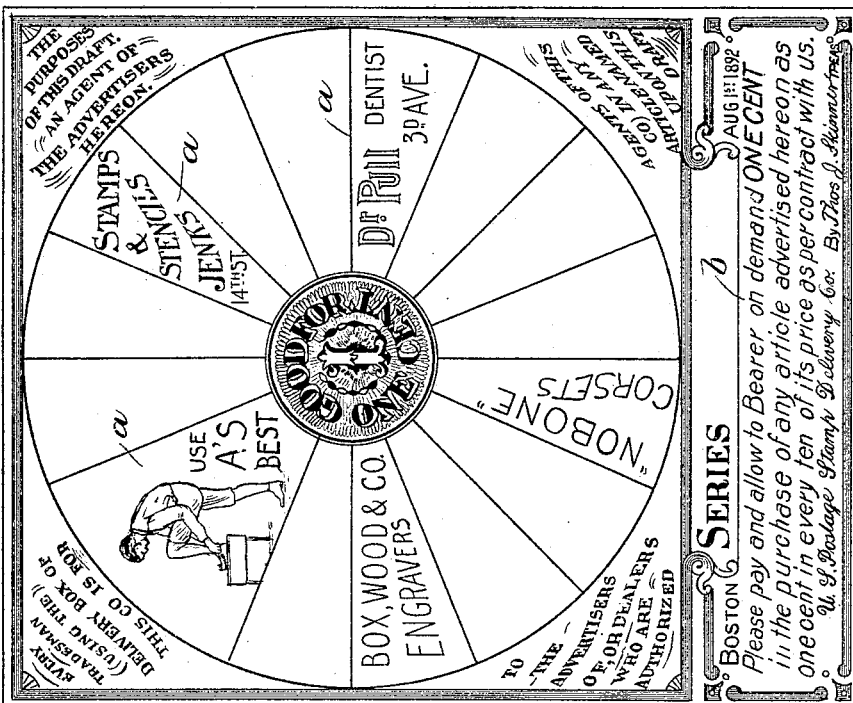
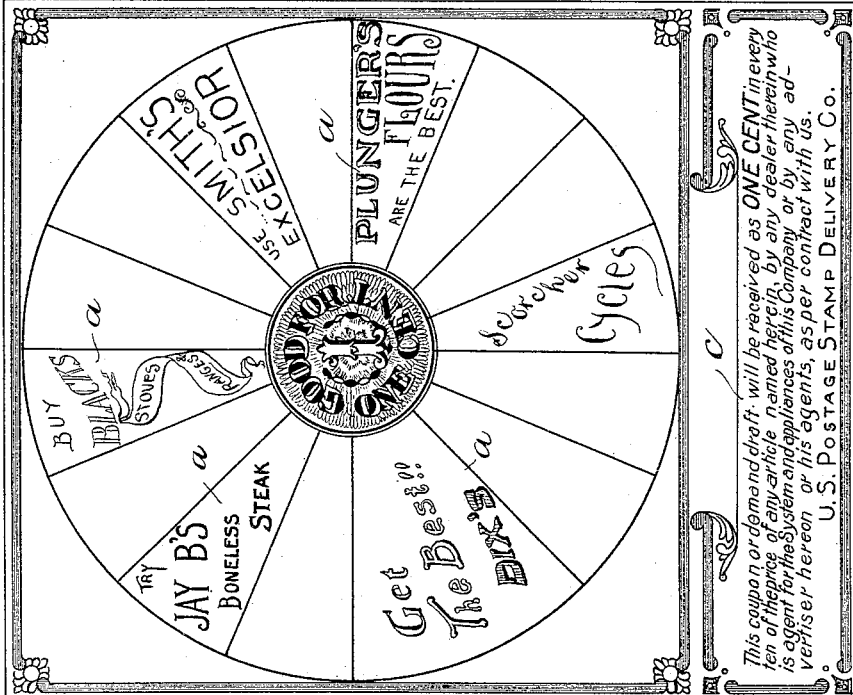

UNITED STATES PATENT OFFICE.

GEORGE H. DREW, OF BOSTON, MASSACHUSETTS, ASSIGNOR, BY MESNE ASSIGNMENTS, TO THE UNITED STATES POSTAGE STAMP DELIVERY COMPANY, OF SAME PLACE.

COMBINED DEMAND-DRAFT AND ADVERTISING-COUPON.

SPECIFICATION forming part of Letters Patent No. 493,619, dated March 14, 1893.

Application filed September 30, 1892. Serial No. 447,368. (No model.)

*To all whom it may concern:*

Be it known that I, GEORGE H. DREW, of Boston, in the county of Suffolk and State of Massachusetts, have invented certain new and useful Improvements in a Combined Demand-Draft and Advertising-Coupon, of which the following is a specification.

This invention has for its object to provide a combined advertising sheet and demand draft which shall enable advertisers named on the said sheet or certificate to pay for the advertising they have received out of a part of the proceeds of the sale of the goods advertised, and which shall further enable sellers of standard articles of a fixed value, such as postage stamps, to receive a profit from the buyers of such articles, and the buyers in turn to receive the amount of said profit from the advertisers.

To these ends the invention consists in the combined demand draft and advertising sheet, as hereinafter described and claimed.

In the accompanying drawings forming a part of this specification—Figures 1 and 2 represent views of the two sides of a combined advertising sheet and demand draft embodying my invention.

The same letters of reference indicate the same parts in all the figures.

In carrying out my invention, I print upon a slip of paper a series of names or advertisements $a\,a$, and a demand draft or order $b$ payable by either of the advertisers whose advertisements appear on the slip or sheet. The advertisements are preferably radially arranged as shown, although any other suitable arrangement may be adopted. The demand draft or order is addressed to the advertisers of, or dealers in, articles named on the sheet, and instructs them to pay and allow to the bearer a specified amount, as one cent, in the purchase of any article advertised on the sheet, the amount allowed being a fractional part, as one tenth, of the price of the article.

The combined advertising sheet and draft may be used in the following manner. The proprietor of a coin controlled machine for selling articles of value, such as postage stamps, incloses in a suitable box or package, stamps of the value of four cents, and one of the above described certificates the face value of the draft being one cent. A purchaser of stamps by depositing five cents in said machine would receive one of said packages, and therefore a full equivalent for the money expended, the value of the stamps being four cents, and the value of the certificate as a medium for use in purchasing goods, one cent. The certificate also contains a guarantee $c$ by the seller of the stamps to the effect that it will be received as part payment for the goods advertised thereon.

It will be seen that by the use of the described certificate articles such as postage stamps may be sold at a profit, and without loss to the purchaser of the stamps, and that advertisers are required to pay for the advertising they receive only when the advertisement has borne fruit.

It will be seen that the described invention comprises, first, all the usual and regular characteristics of a commercial demand-draft with additional co-ordinate features alike unique and useful and together productive of new and useful results and, secondly, an advertising medium carrying a plurality of displayed advertisements easily varied, and holding a reciprocal relation to each other and the draft.

As a demand draft, it possesses all the elements and legal conditions and requirements of a commercial demand-draft, under limitations—but as a draft has the following unique features:—First. It is perpetually self-limited and always uniform in its amount, and in its demand upon payers, whether immediate or subsequent, named upon the draft, and holds a fixed relation to them. Second. It is drawn upon a plurality of (changeable) payers, (present or future,) and while accepted in advance by all upon whom it is drawn, is actually redeemed by but one. Third. It is payable only on definite and uniform conditions of exchange in trade, which must be present with it to make it effective and valid. Fourth. It is a legal exponent of values, having a widely extended convertibility, yet, as such, is protected by specified trade conditions and limitations against either general convertibility, or being itself counterfeited. Fifth. Its functions and negotiability as a draft cease automatically by intrinsic limitations, upon payment by any one of the plural payers (advertisers) present or future, upon whom it is drawn. Sixth. It is an exact exponent of the amount of business done by the maker of the draft with his business connections, and is a perfect check upon the accounts of the maker and the acts of his employés. Seventh. It is a ready and positive exponent to each payer who takes up the draft, of the cost to him, of his advertising through it, as well as of the return it gives him from his advertising.

I claim—

A combined non-separable demand draft and advertising sheet bearing the names and business of a number of dealers and a demand draft on, and a guarantee that the draft will be honored, for a specified amount, by any dealer named thereon, as set forth.

In testimony whereof I have signed my name to this specification, in the presence of two subscribing witnesses, this 27th day of September, A. D. 1892.

GEORGE H. DREW.

Witnesses:
C. F. BROWN,
M. W. JACKSON.